United States Patent
Persson et al.

(10) Patent No.: US 9,471,493 B2
(45) Date of Patent: Oct. 18, 2016

(54) INVALIDATION OF INDEX ITEMS FOR A TEMPORARY DATA STORE

(71) Applicant: ARM LIMITED, Cambridge (GB)

(72) Inventors: Erik Persson, Lund (SE); Ola Hugosson, Lund (SE)

(73) Assignee: ARM Limited, Cambridge (GB)

( * ) Notice: Subject to any disclaimer, the term of this patent is extended or adjusted under 35 U.S.C. 154(b) by 14 days.

(21) Appl. No.: 14/557,649

(22) Filed: Dec. 2, 2014

(65) Prior Publication Data

US 2015/0169452 A1 Jun. 18, 2015

(30) Foreign Application Priority Data

Dec. 16, 2013 (GB) ................................... 1322208.8

(51) Int. Cl.
*G06F 12/00* (2006.01)
*G06F 13/00* (2006.01)
*G06F 13/28* (2006.01)
*G06F 12/08* (2016.01)

(52) U.S. Cl.
CPC ....... *G06F 12/0808* (2013.01); *G06F 12/0895* (2013.01)

(58) Field of Classification Search
CPC .................................................. G06F 12/0808
See application file for complete search history.

(56) References Cited

U.S. PATENT DOCUMENTS

| | | | | | |
|---|---|---|---|---|---|
| 4,322,795 A | * | 3/1982 | Lange | .................. | G06F 12/125 711/136 |
| 5,058,006 A | * | 10/1991 | Durdan | ............... | G06F 12/0808 711/122 |
| 5,067,078 A | * | 11/1991 | Talgam | ............... | G06F 12/0802 365/230.01 |

(Continued)

OTHER PUBLICATIONS

Definition of cache; TechTarget; Sep. 5, 2011; retrieved from https://web.archive.org/web/20110905142103/http://searchstorage.techtarget.com/definition/cache on Jan. 27, 2016 (1 page).*

(Continued)

*Primary Examiner* — Yong Choe
*Assistant Examiner* — Daniel C Chappell
(74) *Attorney, Agent, or Firm* — Nixon & Vanderhye P.C.

(57) ABSTRACT

A data processing apparatus and corresponding method of data processing are provided. The data processing apparatus comprises a temporary data store configured to store data items retrieved from a memory, wherein the temporary data store selects one of its plural data storage locations in which to store a newly retrieved data item according to a predetermined circular sequence. An index data store is configured to store index items corresponding to the data items stored in the temporary data store, wherein presence of a valid index item in the index data store is indicative of a corresponding data item in the temporary data store. Invalidation control circuitry performs a rolling invalidation process with respect to the index items stored in the index data store, comprising sequentially processing the index items stored in the index data store and selectively marking the index items as invalid according to a predetermined criterion.

18 Claims, 5 Drawing Sheets

(56) References Cited

U.S. PATENT DOCUMENTS

| | | | | |
|---|---|---|---|---|
| 5,287,481 | A * | 2/1994 | Lin | G06F 12/0891 711/135 |
| 5,398,325 | A * | 3/1995 | Chang | G06F 12/0831 710/112 |
| 5,812,815 | A * | 9/1998 | Yazdy | G06F 12/0831 711/118 |
| 6,122,709 | A * | 9/2000 | Wicki | G06F 12/0895 711/118 |
| 6,349,364 | B1 * | 2/2002 | Kai | G06F 12/0886 711/129 |
| 6,378,047 | B1 * | 4/2002 | Meyer | G06F 12/0804 711/135 |
| 6,470,437 | B1 * | 10/2002 | Lyon | G06F 12/1054 711/144 |
| 6,553,460 | B1 * | 4/2003 | Chopra | G06F 9/30047 711/125 |
| 6,662,280 | B1 * | 12/2003 | Hughes | G06F 8/4442 711/118 |
| 7,243,204 | B2 * | 7/2007 | Citron | G06F 12/0802 711/130 |
| 7,836,258 | B2 * | 11/2010 | Brown | G06F 12/0808 345/557 |
| 8,364,899 | B2 * | 1/2013 | Ambroladze | G06F 12/126 711/133 |
| 9,087,392 | B2 * | 7/2015 | Doyle | G06T 15/005 |
| 9,218,288 | B2 * | 12/2015 | Alexander | G06F 12/0808 |
| 9,304,923 | B2 * | 4/2016 | Tune | G06F 12/0817 |
| 2002/0174302 | A1 * | 11/2002 | Frank | G06F 12/023 711/130 |
| 2002/0188810 | A1 * | 12/2002 | Nakamura | G06F 12/0802 711/144 |
| 2003/0084251 | A1 * | 5/2003 | Gaither | G06F 12/0804 711/133 |
| 2004/0143711 | A1 * | 7/2004 | So | G06F 12/0808 711/144 |
| 2005/0015555 | A1 * | 1/2005 | Wilkerson | G06F 12/122 711/128 |
| 2005/0086437 | A1 * | 4/2005 | Modha | G06F 12/124 711/133 |
| 2010/0030971 | A1 * | 2/2010 | Usui | G06F 12/0864 711/129 |
| 2011/0080959 | A1 * | 4/2011 | Bjorklund | H04N 19/61 375/240.25 |
| 2012/0317361 | A1 * | 12/2012 | Solihin | G06F 12/0864 711/128 |
| 2013/0170541 | A1 * | 7/2013 | Pace | H04N 19/149 375/240.02 |

OTHER PUBLICATIONS

Cache Organizations for H.264/AVC Motion Compensation; Kim et al; 13th IEEE International Conference on Embedded and Real-Time Computing Systems and Applications; Aug. 21-24, 2007; pp. 534-541 (8 pages).*

Definition of rolling; The Free Dictionary; FARLEX; retrieved from http://www.thefreedictionary.com/rolling on Jan. 27, 2016 (1 page).*

Cache coherence for GPU architectures; Singh et al; 2013 IEEE 19th International Symposium on High Performance Computer Architecture (HPCA2013); Feb. 23-27, 2013; pp. 578-590 (13 pages).*

Search Report for GB 1322208.8 dated May 22, 2014, three pages.

Kim et al., "Cache Organizations for H.264/AVC Motion Compensation", *IEEE Computer Society*, 2007, 8 pages.

Igehy et al., "Prefetching in a Texture Cache Architecture", *Stanford University*, No Date, 11 pages.

* cited by examiner

EXAMPLE BODY TAG ENTRY

SEQUENCE SIZE (13 BITS) = 2 + $LOG_2$ (2048)

MAX_AGE (BODY) = 2048-192
                           (192 ENTRIES FOR PREFETCH)

INVALIDATION OF INDEX ITEMS FOR A TEMPORARY DATA STORE

This application claims priority to GB Patent Application No. 1322208.8 filed Dec. 16, 2013, the entire content of which is hereby incorporated by reference.

The present invention relates to data processing. More particularly the present invention relates to the invalidation of index items for a temporary data store.

BACKGROUND

It is known to provide a data processing apparatus with a temporary data store which is configured to store data items retrieved from a memory. This caching of the data items prevents the data items from being repeatedly retrieved from the memory (with the associated latency of that retrieval) each time they are needed to be accessed.

The temporary data store (cache) may be configured as a circular buffer in which newly retrieved data items are stored in storage locations selected in a predetermined circular sequence.

In addition it is known to provide an index (tag memory) which stores index items corresponding to the data items stored in the temporary data store. However, as data is written over and over again into a circular buffer the risk arises the tag memory references (index items) point to data items that are no longer present in the circular buffer.

Further it is desirable if the index (tag memory) only consumes a limited amount storage space (i.e. corresponds to a limited area when the data processing apparatus is implemented on silicon) and thus the storage of a unique identifier in the index for each data item stored in temporary data store, given typical sizes the temporary data store and the number of temporary data items to be stored, is undesirable.

Accordingly, it would be desirable to provide a technique which addresses the problem of an index item pointing to a data item that is no longer present in the temporary data store, without the above-mentioned disadvantage of a large associated storage of unique identifiers being required.

SUMMARY

Viewed from a first aspect, the present invention provides a data processing apparatus comprising:

a temporary data store configured to store data items retrieved from a memory, wherein the temporary data store has plural data storage locations configured to store the data items and the temporary data store is configured to select a storage location of the plural data storage locations in which to store a newly retrieved data item according to a predetermined circular sequence of the plural data storage locations;

an index data store configured to store index items corresponding to the data items stored in the temporary data store, wherein presence of a valid index item in the index data store is indicative of a corresponding data item in the temporary data store; and invalidation control circuitry configured to perform a rolling invalidation process with respect to the index items stored in the index data store, wherein the rolling invalidation process comprises sequentially processing the index items stored in the index data store and selectively marking the index items as invalid according to a predetermined criterion.

Viewed from a second aspect the present invention provides a data processing apparatus comprising:

means for storing data items retrieved from a memory, wherein the means for storing data items has plural data storage locations configured to store the data items;

means for selecting a storage location of the plural data storage locations in which to store a newly retrieved data item according to a predetermined circular sequence of the plural data storage locations;

means for storing index items corresponding to the data items stored in the means for storing data items, wherein presence of a valid index item in the means for storing index items is indicative of a corresponding data item in the means for storing data items; and means for performing a rolling invalidation process with respect to the index items stored in the means for storing index items, wherein the rolling invalidation process comprises sequentially processing the index items stored in the means for storing index items and selectively marking the index items as invalid according to a predetermined criterion.

Viewed from a third aspect the present invention provides a method of data processing comprising the steps of:

storing data items retrieved from a memory in plural data storage locations configured to store the data items;

selecting a storage location of the plural data storage locations in which to store a newly retrieved data item according to a predetermined circular sequence of the plural data storage locations;

storing index items corresponding to the data items stored in the plural data storage locations, wherein presence of a valid stored index item is indicative of a corresponding data item in the plural data storage locations; and performing a rolling invalidation process with respect to the stored index items, wherein the rolling invalidation process comprises sequentially processing the stored index items and selectively marking the index items as invalid according to a predetermined criterion.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
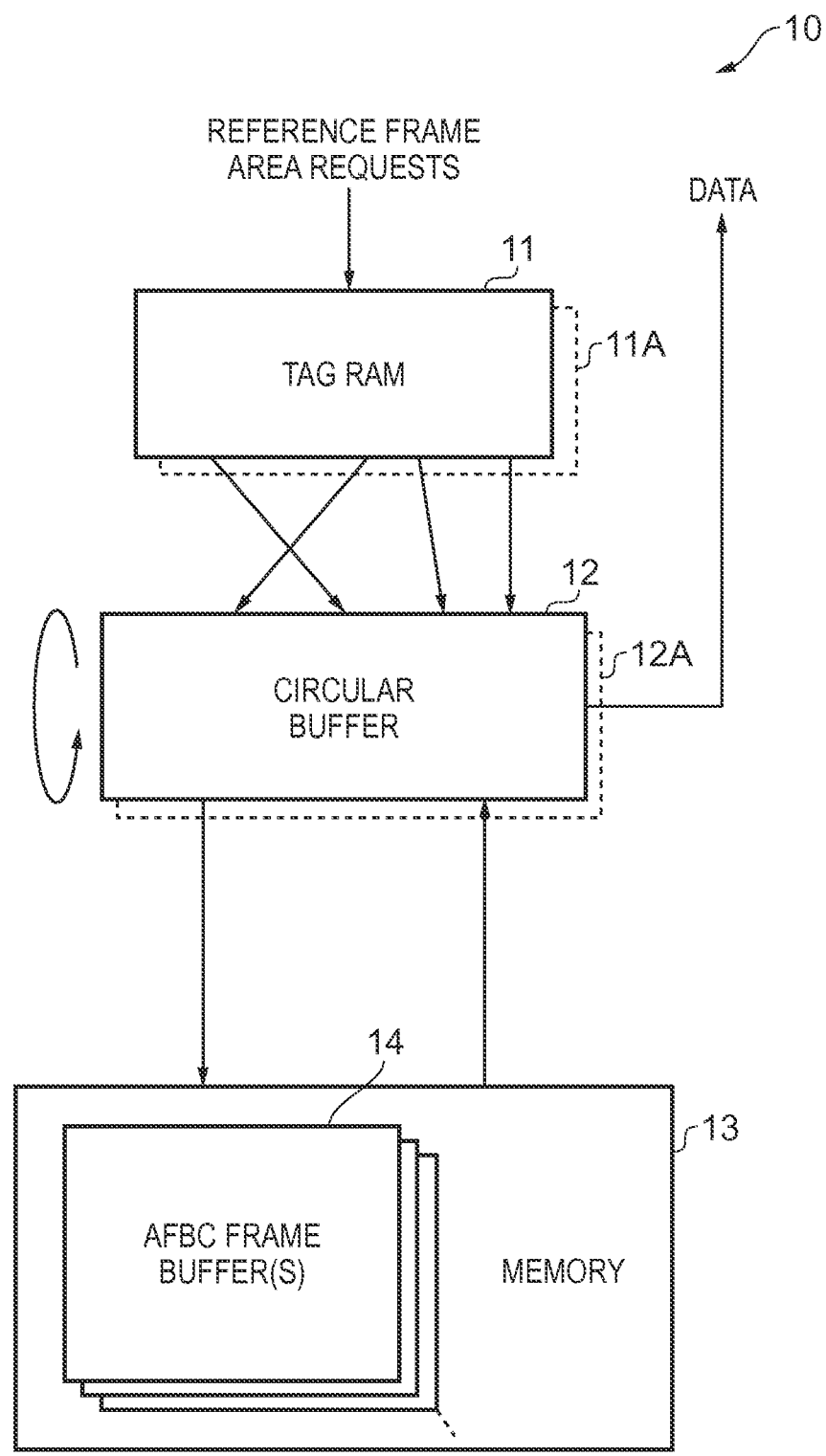
FIG. 1 schematically illustrates a data processing apparatus in one embodiment.

A data processing apparatus comprises: a temporary data store configured to store data items retrieved from a memory, wherein the temporary data store has plural data storage locations configured to store the data items and the temporary data store is configured to select a storage location of the plural data storage locations in which to store a newly retrieved data item according to a predetermined circular sequence of the plural data storage locations; an index data store configured to store index items corresponding to the data items stored in the temporary data store, wherein presence of a valid index item in the index data store is indicative of a corresponding data item in the temporary data store; and invalidation control circuitry configured to perform a rolling invalidation process with respect to the index items stored in the index data store, wherein the rolling invalidation process comprises sequentially processing the index items stored in the index data store and selectively marking the index items as invalid according to a predetermined criterion.

The temporary data store stores each newly retrieved data item according to a predetermined circular sequence of its plural data storage locations (i.e. is configured as a circular buffer), whilst a corresponding new index item is stored in the index data store indicative of the presence of the newly retrieved (and now newly stored) data item. However the connection between index items stored in the index data store and data items stored in the temporary data store is one-way, i.e. it is not possible (or at least prohibitively laborious) to find a corresponding index item stored in the index data store for a given data item stored in the temporary data store. Furthermore, updating the index data store in dependence on updates made to the temporary data store would require undesirable additional control circuitry, so for example and approach of invalidating an index item in the index data store when its corresponding data item in the temporary data store is overwritten would not be a desirable arrangement.

Instead the present invention recognises that a useful approach to keeping track of whether the index items in the tag memory point to data that is still present in the temporary data store can be provided by sequentially processing data items according to a rolling invalidation process which examines each index item in turn and marks particular index items as invalid when a predetermined criterion is fulfilled. This approach thus enables the index items to be invalidated without reference to the temporary data store, but for example by suitable configuration of the pace with which the rolling invalidation process takes place and the order in which the index items are examined it has been found that the set of valid index items can be both trustworthy and large enough for the caching purposes of the temporary data store.

Furthermore, given the desirability of limiting the storage space that needs to be provided for the temporary data store, it is recognised that in some implementations where the data items being temporarily stored in the temporary data store will form part of a large data set, it may well be the case that the limited set of identifiers which is stored in each index item entry may repeatedly wrap around as the data processing apparatus works its way through that large data set. It would be undesirable to increase the size of the identifier that is stored in each index item entry, and the present techniques enable problems which could otherwise arise when such wrap around occurs (not knowing whether an index item corresponds to a new or an old data item) to be mitigated against by means of the rolling invalidation process.

The predetermined criterion may take a variety of forms, but in one embodiment the invalidation control circuitry is configured, when performing the rolling invalidation process, such that the predetermined criterion is fulfilled if a duration for which a selected index item has been stored in the index data store exceeds a predetermined period. Setting the criterion to be a duration for which the selected index item has been stored in the index data store, in other words the "age" of the selected index item, ensures that the rolling invalidation process invalidates the oldest index items, for which the corresponding data items have thus been stored for the longest in the temporary data store and thus have had the greatest chance to have already been used, and so represent the best candidates to be overwritten.

This predetermined period may take a variety of values that may be selected in accordance with the specific system requirements, in particular in dependence on the relative size of the index data store and the temporary data store and/or in dependence on the particular usage which it is desired to make of the temporary data store (e.g. how aggressively index items in the index data store are invalidated, effectively freeing up in the temporary data store).

Further, the manner in which the duration for which the selected index item has been stored in the index data store may be configured in a variety of ways, but in some embodiments the invalidation control circuitry is configured to determine the duration for which the selected index item has been stored in the index data store with reference to a count of a number of index items which have been stored in the index data store since the selected index item was stored in the index data store. As such a counter may be provided which is for example incremented each time an index item is stored in index data store and thus by comparison between the current value indicated by this counter and a value which this counter had when the selected data item was stored in the index data store the duration for which the selected index item has been stored in the index data store can be determined. The value which this counter had when the selected data item was stored in the index data store may be maintained in a variety of different ways, but may for example be directly stored as part of the selected index item entry in the index data store.

In some embodiments the rolling invalidation process comprises two steps, wherein at a first step of the two steps the selected index item is read from the index data store and at a second step of the two steps the selected index item is marked as invalid if a duration for which the selected index item has been stored in the index data store exceeds a predetermined period. Dividing the rolling invalidation process into two steps in this manner may be advantageous because of the access to the index data store which the rolling invalidation process requires. The division of the rolling invalidation process into two steps thus means that reading the index data store only take place at the first step, and no read access is performed at the second step. The power consumption associated with the index data store depends on both the frequency with which it is accessed as well as the "width" of the index store (i.e. the amount of data stored in each of its entries) and thus limiting the frequency with which the index data store is accessed by the rolling invalidation process advantageously moderates the additional power consumption due to implementing the rolling invalidation process.

There are various ways in which the two steps of the rolling invalidation process could be separated and triggered, but in some embodiments a single step of the two steps is performed each time a new index item is stored in the index data store. On the one hand, aligning the rolling invalidation process with the storage of new index item in the index data store (i.e. when a new data item has been stored in the temporary data store) is an expedient manner of configuring the rolling invalidation process, since the addition of the new data item to the temporary data store will have overwritten an older data item and thus there may now be an index item in the index data store whose target is no longer exists. However, it should be noted that by virtue of the fact that only a single step of the two steps is performed each time a new index data item is stored in the index data store, the sequential processing of the index data items by the rolling invalidation process will take twice the depth of the temporary data store to complete one full sweep over the set of index data items stored in the index data store. This then means that the index data items stored in index data store can be kept valid for commensurately longer than if, say, the rolling invalidation process were directly aligned with the depth temporary data store, thus allowing data items in the temporary data store longer with a corresponding valid index item in the index data store such that they may be accessed and (re)used.

There are various ways in which the rolling invalidation process could select index items in the index data store to examine (and potentially invalidate), but in some embodiments the invalidation control circuitry is configured to sequentially perform the rolling invalidation process with respect to a further predetermined circular sequence of storage locations of the index items stored in the index data store. This further predetermined circular sequence of storage locations may for example correspond to a sweep from low to high indices of the storage locations.

In some embodiments the index data store is configured to store a sequence number in association with each of the index items, wherein the sequence number is incremented for each new index item stored in the index data store. The index data store fundamentally needs to store sufficient identification information as part of each index item to allow a determination to be made of whether there is a "hit" or "miss", i.e. whether the content of the index data store indicates that the corresponding data item which is the subject of the current access request is currently stored in the temporary data store. It is advantageous if the size of this identification information can be reduced such that overall size of index data store (in particular its width) can be correspondingly reduced, reducing the silicon area consumed by this component of the data processing apparatus and its corresponding power consumption. The provision of a sequence number which is incremented for each new index item stored in the index data store provides a simple and unique identifier which in particular, if sized appropriately, allows a distinction to be made between an index item written on a first iteration of new entries being made in the temporary data store and an index data item written from a second iteration of new entries being made in the temporary data store.

For example, if the set of sequence numbers only matched the number of possible entries in the temporary data store (say for example, 128 blocks), then a first set of 128 data item fetches to the temporary data store would have been given the sequence numbers 0-127 in the index data store. However, the next 128 data item fetches would also have been given the sequence numbers 0-127. Thereafter when checking the index data store (e.g. by "tag lookup") there would be no telling if a given index data item corresponds to the second lap in the temporary data store or from the old lap and are already overwritten. The wrap-around distance of the sequence numbers can thus be sized to avoid this.

However in addition previously the index data store might have had to store an undesirable long sequence number to avoid problems with the sequence numbers wrapping around during the course of a sequence of data items being retrieved from the memory and stored in the temporary data store. For example, in the context of a video processor which uses the temporary data store to cache portions of a reference frame of image data, a very large sequence number field would be needed to avoid wrapping around several times during the course of a frame. However, the rolling invalidation process provided by the present invention mitigates against this problem by sequentially processing the index items stored in the index data store and selectively marking them as invalid according to a predetermined criterion, which may for example be duration for which a selected index item has been stored in the index data store (its "age"). This advantageously enables the benefit of the "unique identifier" function of the sequence number to be gained, but where the sequence number field can be significant smaller than it would have had to have been prior to the present invention.

Furthermore, the provision of the sequence number may be used to determine the age of index items in the index data store, and in some embodiments the data processing apparatus is configured to determine the duration for which a selected index item has been stored in the index data store with reference to the sequence number stored in association with the selected data item. For example this may be carried out using a difference between a current sequence number (to be allocated to the next index item to be stored in the index data store) and the sequence number stored in association with the selected data item.

Moreover the sequence number can advantageously be used to determine the storage location of the selected data item in the temporary data store by virtue of the fact that the sequential nature of the sequence numbers can be aligned with the predetermined circular sequence of the plural data storage locations. Hence in some embodiments the data processing apparatus is configured, when access to a selected data item in the memory is required, to determine with reference to the index items in the index data store if the selected data item is stored in the temporary data store, and, if it is determined that the selected data item is stored in the temporary data store, to determine a storage location of the selected data item in the temporary data store with reference to the sequence number.

In some embodiments the data processing apparatus is configured to determine the storage location of the selected data item in the temporary data store using a calculation dependent on the sequence number and a modulo of a number of the plural data storage locations in the temporary data store. As mentioned above, the range of the sequence numbers may exceed the number of data items which can be stored in the temporary data store and the introduction of the modulo function can superimpose a "wrap around" on calculation using the sequence numbers to address this.

In some embodiments the data processing apparatus further comprises a counter configured to wrap around at the number of the plural data storage locations in the temporary data store, wherein the counter is incremented for each new index item stored in the index data store, and wherein the storage location of the selected data item in the temporary data store is calculated as a current value of the counter minus a duration for which the selected index item has been stored in the index data store modulo the number of the plural data storage locations in the temporary data store. The counter can thus be configured to correspond directly to the predetermined circular sequence of the plural data storage locations and in principle to give the storage location of the selected data item in the temporary data store. Nevertheless the present techniques recognise that it would be disadvantageous (for storage space reasons) to additionally store the value of the counter in association each new index item stored in the index data store, and these embodiments advantageously allow the storage location to be determined with reference to a current value of the counter minus the "age" of the selected data item (modulo the size of the temporary data store). Using a current value of the counter means that no storage of the value of the counter in association each new index item is required whilst the "age" of the selected data item can be determined with reference to its stored sequence number.

In some embodiments the data processing apparatus is configured, when access to a selected data item in the memory is required, to determine with reference to the index items in the index data store if the selected data item is stored in the temporary data store, and, if it is determined that the selected data item is stored in the temporary data store, to determine if a duration for which the selected index item has been stored in the index data store exceeds a predetermined period, and, if the duration for which the selected index item has been stored in the index data store exceeds the predetermined period, to cause the selected data item to be retrieved from the memory. Accordingly, in other words if the age of the selected data item is found to be too great, then the "look up" in the index data store is treated in the same manner as if the selected index item had not been stored in the index data store, i.e. if the "look up" had resulted in a "miss". This advantageously provides another mechanism for enforcing the "age rule", which some embodiments of the rolling invalidation process use for the predetermined criterion. This is advantageous because of the further opportunity that it provides for identifying index items which have already become too old, but have not yet been picked up by the rolling invalidation process.

In some embodiments, the data processing apparatus is configured, when access to a selected data item in the memory is required, to determine with reference to the index items in the index data store if the selected data item is stored in the temporary data store, and if a selected index item corresponding to the selected data item is marked as invalid, to cause the selected data item to be retrieved from the memory. Thus in these embodiments as well the "lookup" in the index data storage is handled in the same manner as if the selected index it had not been stored in the index data store, i.e. if the "look up" had resulted in a "miss". This provides an expedient mechanism for handling in its items which are marked as invalid.

The number of data items which the temporary data store can store can be flexibly configured in dependence on the particular system requirements. In particular the number of data items may essentially correspond to the "maximum age" which the rolling invalidation process may have configured as it predetermined criterion. When this is the case the temporary data store is then provided as a dedicated caching mechanism for data items which may be requested from memory in which the size of the temporary data is determined by the number of times that data items stored therein are expected to be accessed (to avoid repeated external memory fetches). However, the temporary data store may also be provided in order to function as a prefetch buffer to mitigate against the long latency of the external memory. Accordingly, in some embodiments a number of the plural data storage locations in the temporary data store is greater than a number of index items corresponding to the predetermined period. Hence, the portion of the temporary data store which "exceeds" the "maximum age" is thus provided for the purpose of this prefetching.

In some embodiments the data processing apparatus is configured, when it is determined that the newly retrieved data item must be retrieved from the memory to the temporary data store, to delay the retrieval until a previous data item stored in the storage location has been stored in the temporary data store for longer than the predetermined period. Accordingly whilst the "maximum age" may on the one hand the used as an upper boundary by the rolling invalidation process, beyond which identified index items are marked as invalid, on the other hand the "maximum age" may additionally be used as a "minimum age" which a data item in the temporary data store must reach before it is allowed to be overwritten. This advantageously provides a data processing apparatus with a mechanism for ensuring that data items temporarily stored in the temporary data store will not be removed while they are expected to be still in use, this being set up by appropriate selection of the "maximum/minimum age".

As mentioned above the data processing apparatus may be a video processor and in some such embodiments the data items are portions of a reference frame of video data. For example, the data items may correspond to an area of pixels from within the reference frame which are required data processing purposes. In the context of a video processor and a reference frame of video data these areas of pixels may for example be subsequently used for motion compensation or motion estimation. These reference frames may be stored in a compressed representation (for example having the advantage of yielding a higher storage capacity per silicon area).

Access to the index data store may be configured to be accessed in a number of different ways, but in some embodiments each index item is stored in the index data store at a location given by a hash of at least one identifier associated with the corresponding portion of the reference frame. These identifiers may take a number of different forms, but in some embodiments the at least one identifier comprises at least one of: coordinate value information, a reference frame identifier, and information regarding a storage location in the memory. The coordinate information may for example be a set of (x,y) coordinates, the reference frame identifier may for example allow one reference frame to be distinguished from the next and the information regarding a storage location in the memory may for example be an offset into a buffer in memory from which the data item is retrieved.

FIG. 1 schematically illustrates a data processing apparatus 10 in one embodiment. This data processing apparatus 10 is in fact a video engine of which only a very limited set of components of relevance to the present disclosure are shown in FIG. 1 and discussed here. These components comprise a tag RAM 11, a circular buffer 12 and a memory 13. The subsystem shown in FIG. 1 is responsible for fetching parts of reference frames upon area requests issued by firmware within the video engine. These area requests correspond to small data structures containing various control bits as well as coordinates specifying an area of pixels to be fetched from a reference frame. The pixels fetched by this subsystem are subsequently used by the video engine for motion compensation or motion estimation.

Pixel data are retrieved from the memory 13, and in particular the frame buffer 14 (which in the illustrated embodiment is an AFBC (ARM® Frame Buffer Compression) frame buffer, as provided by ARM Limited, Cambridge, UK). The retrieved pixel data are cached in the circular buffer 12 (which thus acts as a temporary data store) such that the pixels fetched for one area request may be reused by subsequent area requests thus saving power and memory bandwidth. In addition, as will be described in more detail below, the circular buffer 12 is sized such that area requests may also be serviced which are issued some time in advance of when the retrieved pixel data is actually required such that the circular buffer 12 and thus also serves a prefetching/latency hiding function. The "circular" nature of the circular buffer 12 is graphically illustrated in FIG. 1 by the looping arrow shown to its left. This corresponds to the fact that the data items (blocks of compressed pixel data), when retrieved from the AFBC frame buffer 14, are stored in the circular buffer 12 in one of its plural storage locations on the basis of a predetermined circular sequence of those locations. Note that where the AFBC frame buffer 14 may be considered to correspond to a single reference frame, there will typically be multiple such frames stored in the memory 13 and the multiple set of "AFBC frame buffer(s)" 14 shown in FIG. 1 represents this.

The tag RAM 11 is provided in association with the circular buffer 12 and enables a determination to be made when a reference frame area request is received of whether or not the corresponding specified data item is currently stored in the circular buffer 12. Accordingly, when a new data item is stored in the circular buffer 12, a corresponding new entry (index item) is made in the tag RAM 11. The presence of a valid tag entry in tag RAM 11 is indicative of the presence of a corresponding data item in the circular buffer 12. However, due to the fact that data items are written over and over again into the entrance of the circular buffer, a mechanism is required to keep track of whether the tag entries in the tag RAM 11 point to data items that are still present in the circular buffer 12. The mechanism provided for doing this will be described in more detail below.

The dashed lines 11A and 12A in FIG. 1 schematically illustrate the fact that the tag RAM 11 and circular buffer 12 may in fact each be divided into two (or more) parts (which may be embodied as entirely separate components, contiguous components, or merely logical subdivision within single components), in this example a first part being provided for AFBC headers and the second part been provided for AFBC body data. In the illustrated embodiment the circular buffers 12 and 12A are configured to cache aligned 32-byte blocks of compressed data. In the case of the headers, each 32-byte block will fit two headers. For the body data, two or more 4×4 pixel blocks may fit depending on the compression and data alignment.

Figure 2:
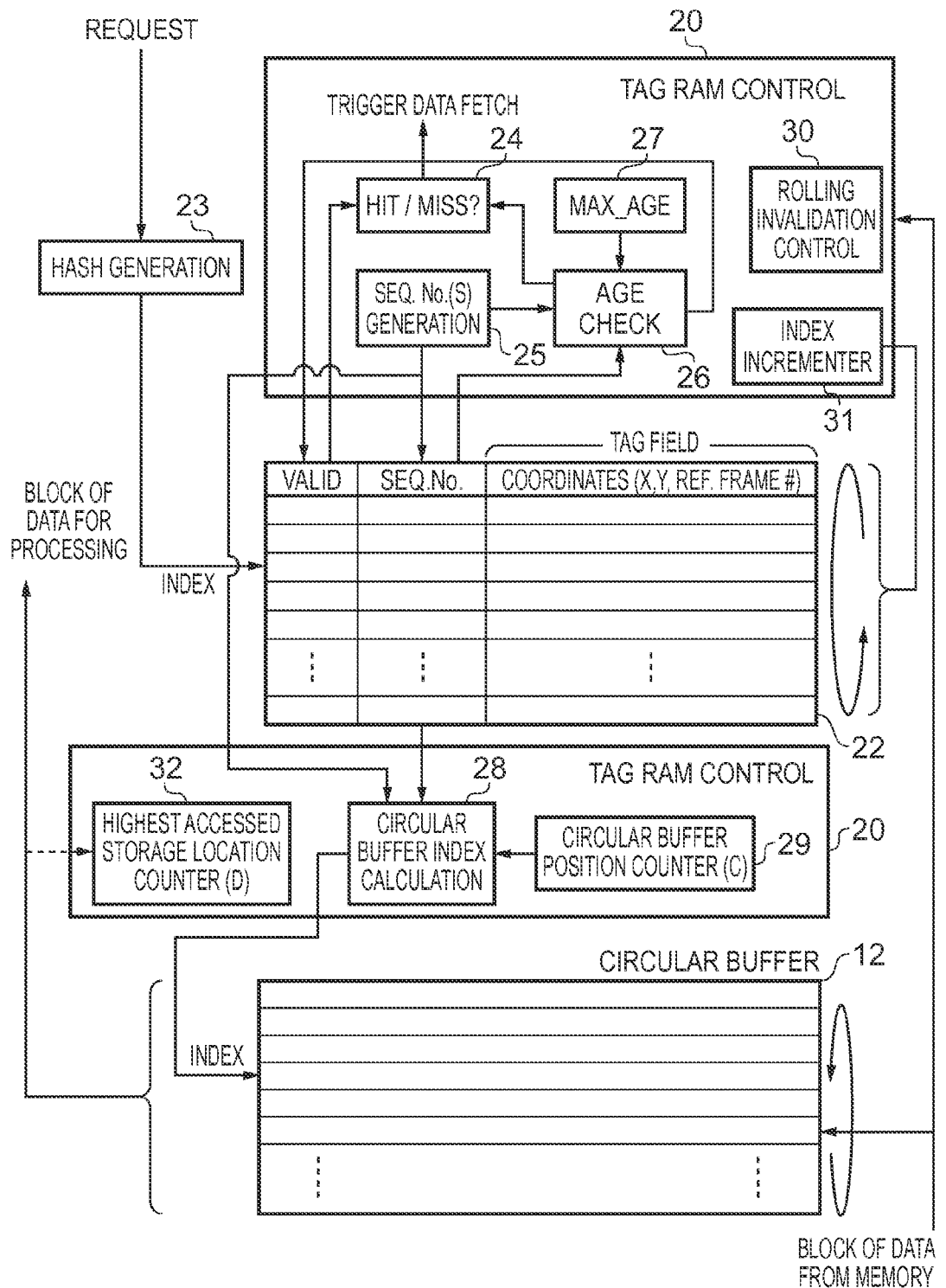
FIG. 2 schematically illustrates in more detail the tag RAM and circular buffer of FIG. 1 in one embodiment.

FIG. 2 schematically illustrates in more detail the configuration of the tag RAM 11 and the circular buffer 12 in one embodiment. More detail in particular is given of the configuration of the tag RAM 11 which in the illustration of FIG. 2 is represented by all components shown other than the circular buffer 12. These components of the tag RAM 11 are represented by the tag RAM control 20 and 21, the tag RAM storage 22 and the hash generation unit 23.

When the reference frame area request is received by tag RAM 11 it is first received by the hash generation unit 23. The hash generation unit 23 is in particular configured to generate an index into the tag RAM storage 22. This is done on the basis of identifiers included in the reference area request. Header tags are indexed by a hash of the reference frame number and an (x,y) coordinate of the area requested, whilst body tag indexing instead uses a hash of the reference frame number offset into the AFBC frame buffer 14. Each tag entry stores a valid bit, a sequence number and a tag field. The use of the valid bit and sequence number will be described in more detail below. The tag field is populated with bits derived from "coordinates" in the area request (x,y coordinates and reference frame number). Essentially the information stored in the tag field enables the tag RAM to determine whether a cache "hit" or a cache "miss" has occurred when a request is looked up in the tag RAM. One of ordinary skill in this technical field is very familiar with the mechanisms provided to enable such cache look up functionality and further detailed description is dispensed with here for brevity. This functionality is merely summarised by the functional "hit/miss?" block 25 shown as part of the tag RAM control 20.

When a request is looked up in the tag RAM 11, if a provisional "hit" occurs (i.e. the relevant tag content matches with respect to the content of the tag field) then the tag RAM control 20 is configured to further examine the corresponding valid bit and the sequence number. This examination is shown in the figure as being carried out by the functional "hit/miss?" block 25. The valid bit indicates the validity of this entry in the tag RAM, i.e. whether it may be used or not. If the valid bit indicates that this entry is invalid, then the tag RAM 11 is configured to treat the request as if a cache "miss" had occurred and the requested data is retrieved from memory 13. Tag RAM control unit 20 is additionally configured when such a provisional "hit" occurs to examine the content of the sequence number field. The sequence field is populated when a new entry is made in the tag RAM by the sequence number generation unit 25 in the tag RAM control 20. The sequence number generation unit 25 is in fact configured as a counter S which increments through a predetermined sequence of values, a new value in this sequence being provided as the corresponding sequence number of a new entry in the tag RAM. When the provisional "hit" occurs an age check is performed by the age check unit 26. This age check comprises comparing the sequence number retrieved from the matching block and comparing this against a maximum age (MAX_AGE) 27 which is predetermined for the operation of the tag RAM and stored within the tag RAM control 20. If a block is older than the maximum value (shown as a signal to the "hit/miss?" unit 24) then the block is considered to be expired. The expired blocks are, like invalid blocks, treated like cache misses and will cause the same data to be fetched again.

A further function of the tag RAM control 20 is to administer a rolling invalidation process. This is a housekeeping mechanism, administered by the rolling invalidation control unit 30, which sweeps repeatedly from low to high cache indices, searching for entries older than MAX_AGE and invalidating those entries. The tag RAM control 20 is provided with an index incrementer 31 which enables track to be kept of the next entry to examine. The continuous loop of cache indices swept by the rolling invalidation process is graphically illustrated in FIG. 2 by the looping arrow shown to the right of the tag storage unit 22. The rolling invalidation process comprises two steps and one of two steps is carried out each time a new entry is stored in the circular buffer 12 (i.e. when a new 32-byte block of compressed data is retrieved from memory). One of ordinary skill in this technical field is very familiar with the mechanisms provided to enable such a newly retrieved block to be added to the circular buffer 12 and the tag RAM 11 and further detailed description is dispensed with here for brevity. This functionality is merely summarised in FIG. 2 by the arrow labelled "block of data from memory".

At a first step of the rolling invalidation process a next entry in the tag storage 22 is read. At the second step of the rolling invalidation process that entry read at the first step is examined, in particular by the age check unit 26, which determines if the entry is older than MAX_AGE 27. If this is true then the valid bit stored in association with this entry is caused to be set to "invalid". Care is taken not to invalidate an different brand new entry which is written between the first step and the second steps and happened to overwrite the same entry.

Because only one of the two alternating steps of the rolling invalidation process is carried out every time a new block of data is added to the circular buffer 12, the housekeeping loop takes twice the cache depth of circular buffer to complete one sweep over the indices of the tag RAM storage 22. Accordingly, the sequence numbering generated by the sequence number generation unit 25 then have progressed by twice the depth of the cache, meaning that the minimum of 1+log 2 (cache depth) number of bits are required to store the sequence numbers in the sequence number field of the tag RAM storage 22. Nevertheless, the rolling invalidation process following up behind the new entries created in the tag RAM storage 22 and invalidating those that have become too old means that the number of bits allocated to storing the sequence number field in tag RAM storage 22 can be significantly reduced from what might otherwise be the case (in order to protect against the wrap around issues mentioned above, when the sequence numbers repeat) without the rolling invalidation process.

Now returning to a consideration of the tag RAM lookup process, if the entry in the tag storage unit 22 indexed into by the index generated by the hash generation unit 23 on the basis of the received requests does contain a "valid" entry which is not determined to be too old, then the corresponding data item stored in the circular buffer can be used. The storage location of the corresponding data item is determined by the circular buffer index calculation unit 28 in tag RAM control 21, the corresponding block is retrieved and is passed to the requester for processing (see arrow "block of data for processing"). As an aside it should be noted that although tag RAM control 20 and 21 are schematically illustrated separately in FIG. 2 this is predominantly for clarity of illustration and there is no reason why only a single contiguous tag RAM control unit should not equally be provided instead.

The circular buffer index calculation unit 28 determines an index into the circular buffer 12 on the basis of the sequence number retrieved from the matching entry, an indication of the current value generated by the sequence number generation unit 25 and a value generated by the circular buffer position counter 29. The circular buffer position counter 29 is in fact configured as a counter C which increments through a predetermined sequence of values, a new value in this sequence being generated when a new entry is stored in the tag RAM. Like was shown in FIG. 1, the "circular" nature of the circular buffer 12 is graphically illustrated in FIG. 2 by the looping arrow shown to its right.

The circular buffer position counter directly corresponds to the circular buffer size and thus when a new entry is stored in tag RAM, the value of the counter C corresponds directly to the index of the storage location of the corresponding data item in the circular buffer 12. However these values of C are not stored in the tag RAM storage unit 22 (because it would be prohibitively expensive in terms of storage space to do so). Instead the circular buffer index calculation unit 28 is configured to determine the index of the storage location of the data item corresponding to the match just found in the tag RAM by effectively recalculating what that value C would have been when that data item was originally stored in the circular buffer. The value of the counter C at an earlier time t0 can be determined at a later time t1 (when a lookup is performed, found "hit" and thus corresponding position in the circular buffer is sought) according to the following formula:

$$C(t0)=(C(t1)-age) \bmod \text{BUFFSIZE},$$

where age represents the age of the matching entry in the tag RAM (measured in terms of a difference of sequence counter values) and BUFFSIZE represents the circular buffer size.

This determination can be better understood from the following explanation. Consider if the value of a theoretical very large counter N (sufficient to count up though the full range of operation of the data processing unit) were to be known. The value of the (much smaller) counter S 25 can be related to the theoretical big counter N as:

$$S(N)=N \bmod SRANGE$$

where the SRANGE is the range of the sequence numbers (2 to the power of the number of bits used to store a sequence number), whilst the value of the (also much smaller) counter C is always equivalent to:

$$C(N)=N \bmod \text{BUFFSIZE}$$

At any time t0 for which a sequence number is set in the tag RAM the value of S from that time is used, i.e.:

$$S(t0)=t0 \bmod SRANGE$$

At some later time t1 a lookup is performed, results in a hit and the corresponding position in the circular buffer is required to be found. Whilst it would have been convenient if C(t0) had been stored in the tag RAM, it is not as explained above for space reasons, and instead use can be made of the equalities:

$$C(t0)=t0 \bmod \text{BUFFSIZE}=(t1-t1+t0) \bmod \text{BUFFSIZE}=(t1-(t1-t0)) \bmod \text{BUFFSIZE}=(t1-age) \bmod \text{BUFFSIZE}$$

Because of the rolling invalidation process, there's a limit on how old entries can be in the tag RAM (age<MAX_AGE<SRANGE) and so $$age=t1-t0=t1-t0 \bmod SRANGE=((t1 \bmod SRANGE)-(t0 \bmod SRANGE)) \bmod SRANGE=S(t1)-S(t0) \bmod SRANGE$$

and thus finally $$C(t0)=(t1-age) \bmod \text{BUFFSIZE}=((t1 \bmod \text{BUFFSIZE})-age) \bmod \text{BUFFSIZE}=(C(t1)-age) \bmod \text{BUFFSIZE}.$$

As a result the values S(t1) and C(t1) of the counters S and C can be used together with the tag entry sequence number S(t0) to determine the circular buffer position.

Finally, the tag RAM control 20 also comprises a highest accessed storage location counter D, which like counter C is configured to count modulo BUFFSIZE, and tracks the newest (highest) storage location that has been read by the receiver of the data (AFBC decoder) by incrementing by one whenever the storage location D+1 is read. As will be described in more detail below, the value of this counter D is used by the tag RAM control 20 delay commencing an external memory access to fetch a new block if it is determined that the storage location into which that new block will be written (and in particular the content thereof) is still in use.

Figure 3:
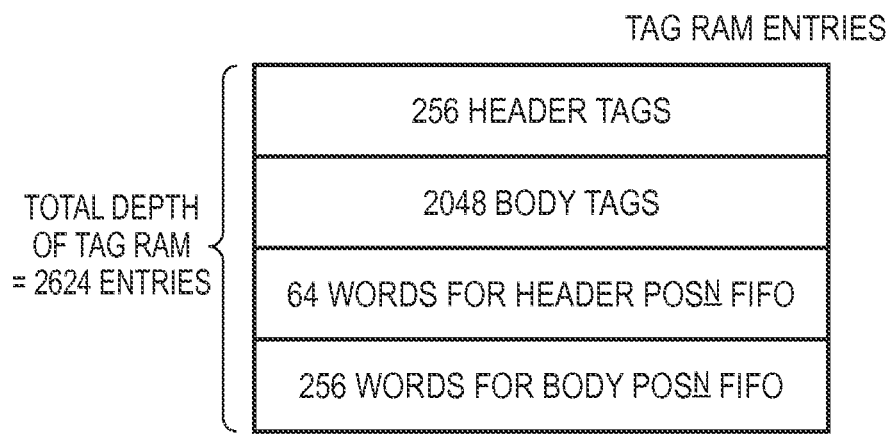
FIG. 3 schematically illustrates a number of entries of different types in the tag RAM in one embodiment, together with more detail of a corresponding example entry and some corresponding sizing parameters in one embodiment.
Figure 3:
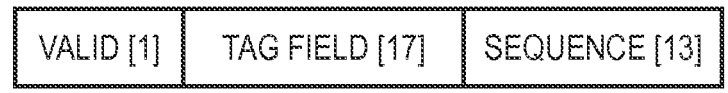

FIG. 3 schematically illustrates a number of entries of different types in the tag RAM in one embodiment. As mentioned above with reference to FIG. 1 the tag RAM is in fact configured to store separate body tag entries and header tag entries, and in this illustrated embodiment the tag RAM configured to store 256 header tags and 2048 body tags. Still further, in this embodiment the tag RAM is configured to store header position information and body position information, a header position FIFO and a body position FIFO (conceptually similar to the header circular buffer and body circular buffer) being provided for this purpose. These are not explicitly illustrated, but form part of the tag RAM 11 in a conceptually similar manner to the additional part 11A shown in FIG. 1. These are used to keep track of indices into the circular buffers into which entries which are already the subject of a fetch, but have not yet arrived in the circular buffers, will be stored. This allows for the fact that retrieval of an entry from memory may for example take between 100 and 1000 cycles to complete. A decode unit of the data processing apparatus (not illustrated) make use of these FIFO entries to track where requested entries will be found once they have arrived. In the illustrated embodiment the tag RAM is configured to store 64 words of header position information and 256 words the body position information. It is noted here as an aside that because position FIFOs are also stored in the tag RAM there around 4 RAM accesses per cache access plus about one for the rolling invalidation process. The increase in RAM access count is lower than the decrease in RAM width enabled by the rolling invalidation process, and thus the power consumption aspect is kept under control.

An example body tag entry is also shown in FIG. 3, showing that one bit is used to store the valid it, 17 bits are used for the tag field and 13 bits are used to store the sequence number. Where in this example embodiment the tag RAM is configured to store 2048 body tags, the 13 bits used store the sequence number can be seen to correspond to the above-mentioned minimum of 1+log 2 (2048) bits, with an additional bit used as a safety margin against particular corner case scenarios, giving 13 bits in total. It should be noted that the implementation of the rolling invalidation process in this embodiment has thus enabled a reduction in the tag RAM width by about a third, from 46 to 31 bits. Also, in this embodiment can be seen that MAX_AGE has been set to 2048−192=1856, where 192 entries have thus been allocated for prefetch purposes.

Figure 4:
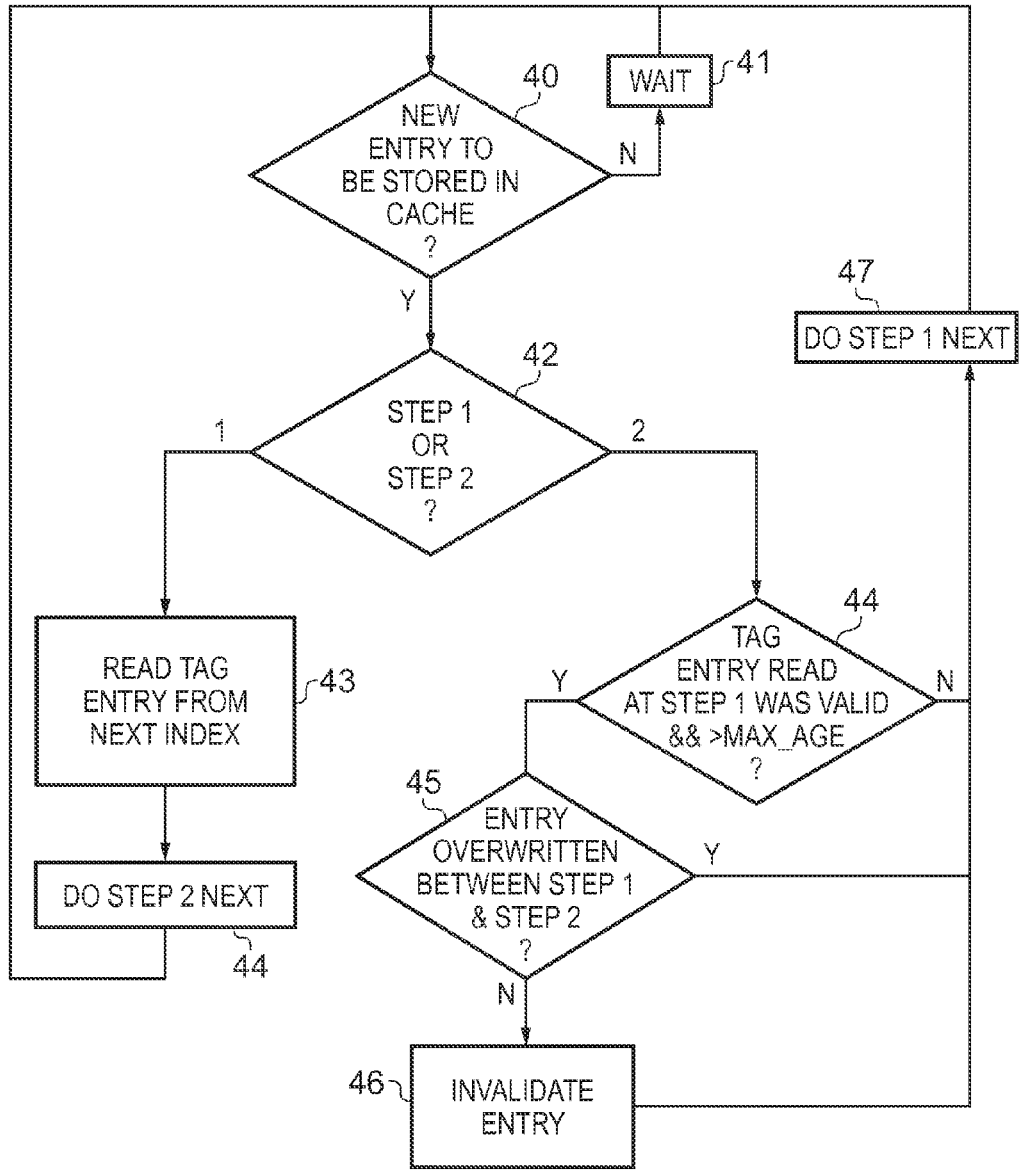
FIG. 4 schematically illustrates a sequence of steps which are taken by a rolling invalidation process in one embodiment.

FIG. 4 schematically illustrates a sequence of steps which are carried out in one embodiment by the tag RAM control 20, and in particular by its rolling invalidation control unit 30, to implement the rolling invalidation process. The flow can be considered to begin at step 40 where is determined if a new entry is to be stored in the cache (i.e. a data item in the circular buffer 12, and it corresponding tag information in the tag RAM 11). Whilst this is not true the flow loops back via step 41, waiting until this happens. Once this condition is fulfilled at step 40 the flow proceeds to step 42 where it is determined whether step one or step two of the rolling invalidation process should be carried out. When step one of the rolling invalidation process should be carried out the flow proceeds to step 43 where the next index indicated by the index incrementer 31 indicates a tag entry to be read from the tag RAM storage 22. This is done, with the content of the tag entry being held in the tag RAM control 20 (by storage provided therefor not explicitly shown) until step two is carried out. At step 44 the rolling invalidation control 30 updates an internal flag (not explicitly shown) to indicate that step two should be carried out next and the flow returns to step 40. When another new entry is to be stored in the cache then the flow again proceeds to step 42 but this time from here the flow proceeds to step 44 in order for step two of the rolling invalidation process to be carried out. At step 44 it is determined if the tag entry read at step was valid and older than the predetermined age limit MAX_AGE. If this is true then the flow proceeds to step 45, where it is checked if the corresponding entry has already been overwritten by the new entry being stored in the cache. If this is not the case then the flow proceeds to step 46 where the tag RAM control 20 (in particular the age check unit 26) causes the valid bit to be updated to invalidate this entry. Thereafter, or if the answer at step 44 was no, or if the answer at step 45 was yes, the flow proceeds to step 47 where the rolling invalidation control 30 updates the internal flag now to indicate that step one should be carried out next. The flow then returns to step 40, ready for step one to be carried out once the next entry is to be stored in the cache.

Figure 5:
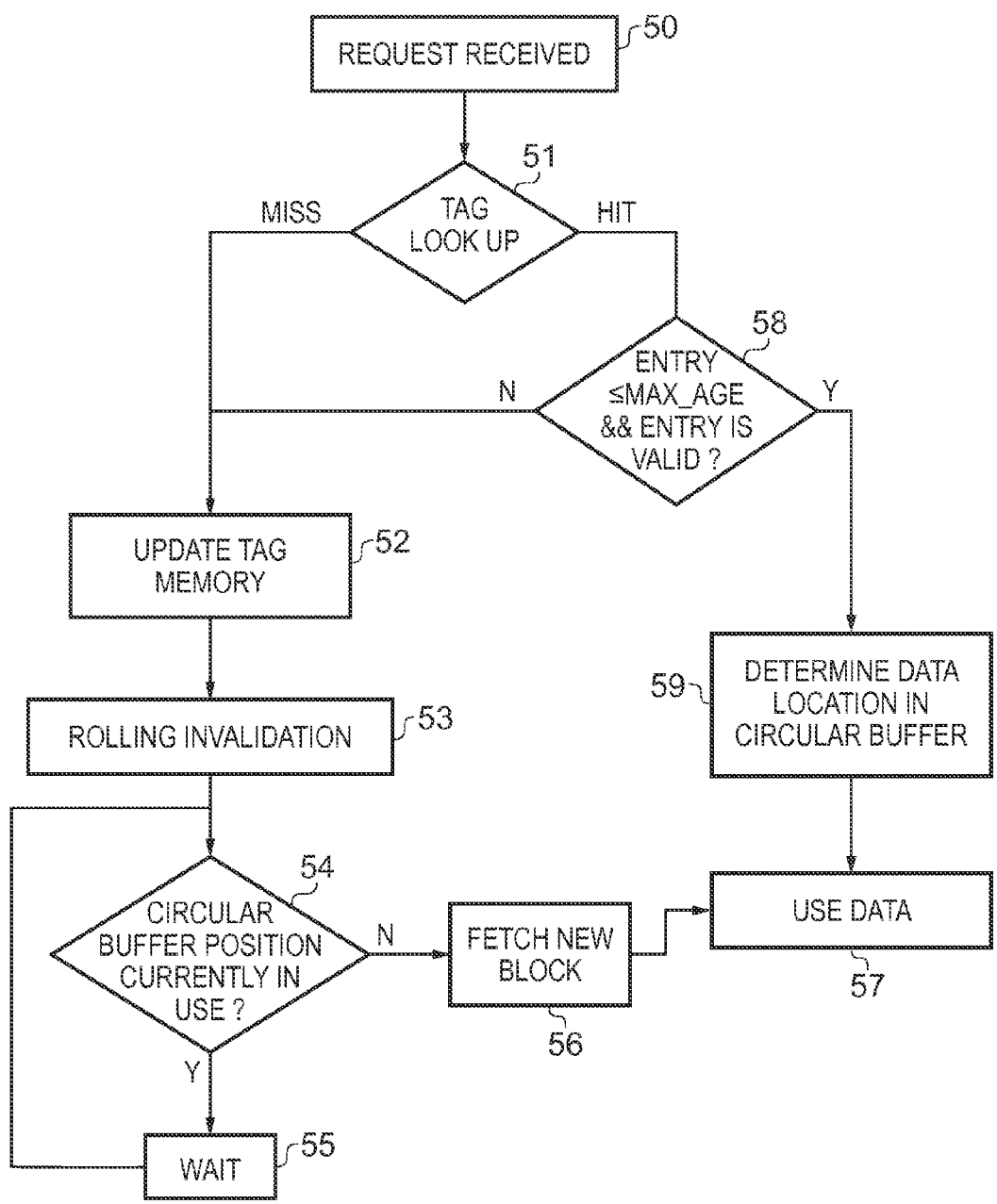
FIG. 5 schematically illustrates a sequence of steps which are taken by a data processing apparatus in one embodiment.

FIG. 5 schematically illustrates a sequence of steps which are taken by the data processing apparatus 10 of FIG. 1 in one embodiment. The flow begins at step 50 when a new reference frame area request is received. Then at step 51 a tag look up procedure is carried out on the content of the tag RAM 11. If this misses, then the flow proceeds to step 52 where the tag memory is appropriately updated, if necessary. Then at step 53 one of the two steps of the rolling invalidation process (as described above for example with reference to FIG. 4) is carried out. Thereafter at step 54 it is determined if the circular buffer position to which a new block must now be fetched is currently in use. The tag RAM control 20 is configured to wait (step 55) before commencing the external memory access to fetch the required block (at step 56), until a flow control condition is met. This flow control condition is that the circular buffer position to which the block will be fetched (C) must not be equal to:

$$(D - \mathrm{MAX\_AGE}) \bmod \mathrm{BUFFSIZE}$$

where D is the newest (highest) storage location that has been accessed by the receiver of the requested data.

Once the new block has been fetched at step 56, the data can be used as required at step 57. Returning to step 51, if the tag look up procedure carried out on content of the tag RAM 11 hits (and here it should be understood that this only means that the tag field information matched, in other words is the "provisional hit" referred to above) then the flow proceeds to step 58 where the tag RAM control 20 determines if the valid bit of this matching entry is set to indicate "valid" and the age of the entry (as determined with reference to its stored sequence number) is less than or equal to MAX_AGE. If either of these conditions are not true then the flow proceeds to step 52 and the access is treated like a cache miss. In this instance the update of the tag memory 52 can comprise setting the valid bit of this entry to now indicate "invalid". If however both of these conditions are met at step 58 then the flow proceeds to step 59 where the location of the data in the circular buffer is determined (as described above by the action of the circular buffer index calculation unit 28) and thereafter the flow proceeds to step 57 where the cached data is used as required.

In overall summary a data processing apparatus and corresponding method of data processing are provided. The data processing apparatus comprises a temporary data store configured to store data items retrieved from a memory, wherein the temporary data store selects one of its plural data storage locations in which to store a newly retrieved data item according to a predetermined circular sequence. An index data store is configured to store index items corresponding to the data items stored in the temporary data store, wherein presence of a valid index item in the index data store is indicative of a corresponding data item in the temporary data store. Invalidation control circuitry performs a rolling invalidation process with respect to the index items stored in the index data store, comprising sequentially processing the index items stored in the index data store and selectively marking the index items as invalid according to a predetermined criterion.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A data processing apparatus comprising:
a temporary data store configured to store data items retrieved from a memory, wherein the temporary data store has plural data storage locations configured to store the data items and the temporary data store is configured to select a storage location of the plural data storage locations in which to store a newly retrieved data item according to a predetermined circular sequence of the plural data storage locations;
an index data store configured to store index items corresponding to the data items stored in the temporary data store, wherein presence of a valid index item in the index data store is indicative of a corresponding data item in the temporary data store; and
invalidation control circuitry configured to perform a rolling invalidation process with respect to the index items stored in the index data store, wherein the rolling invalidation process comprises sequentially processing the index items stored in the index data store and selectively marking the index items as invalid according to a predetermined criterion,
wherein the invalidation control circuitry is configured, when performing the rolling invalidation process, such that the predetermined criterion is fulfilled if a duration for which a selected index item has been stored in the index data store exceeds a predetermined period, and
wherein the invalidation control circuitry is configured to determine the duration for which the selected index item has been stored in the index data store with reference to a count of a number of index items which have been stored in the index data store since the selected index item was stored in the index data store.

2. The data processing apparatus as claimed in claim 1, wherein the rolling invalidation process comprises two steps, wherein at a first step of the two steps the selected index item is read from the index data store and at a second step of the two steps the selected index item is marked as invalid if a duration for which the selected index item has been stored in the index data store exceeds a predetermined period.

3. The data processing apparatus as claimed in claim 2, wherein a single step of the two steps is performed each time a new index item is stored in the index data store.

4. The data processing apparatus as claimed in claim 1, wherein the invalidation control circuitry is configured to sequentially perform the rolling invalidation process with respect to a further predetermined circular sequence of storage locations of the index items stored in the index data store.

5. The data processing apparatus as claimed in claim 1, wherein the index data store is configured to store a sequence number in association with each of the index items, wherein the sequence number is incremented for each new index item stored in the index data store.

6. The data processing apparatus as claimed in claim 5, wherein the invalidation control circuitry is configured, when performing the rolling invalidation process, such that the predetermined criterion is fulfilled if a duration for which a selected index item has been stored in the index data store exceeds a predetermined period, and wherein the data processing apparatus is configured to determine the duration for which a selected index item has been stored in the index data store with reference to the sequence number stored in association with the selected data item.

7. The data processing apparatus as claimed in claim 5, wherein the data processing apparatus is configured, when access to a selected data item in the memory is required, to determine with reference to the index items in the index data store if the selected data item is stored in the temporary data store, and, if it is determined that the selected data item is stored in the temporary data store, to determine a storage location of the selected data item in the temporary data store with reference to the sequence number.

8. The data processing apparatus as claimed in claim 7, wherein the data processing apparatus is configured to determine the storage location of the selected data item in the temporary data store using a calculation dependent on the sequence number and a modulo of a number of the plural data storage locations in the temporary data store.

9. The data processing apparatus as claimed in claim 8, wherein the data processing apparatus further comprises a counter configured to wrap around at the number of the plural data storage locations in the temporary data store, wherein the counter is incremented for each new index item stored in the index data store, and wherein the storage location of the selected data item in the temporary data store is calculated as a current value of the counter minus a duration for which the selected index item has been stored in the index data store modulo the number of the plural data storage locations in the temporary data store.

10. The data processing apparatus as claimed in claim 1, wherein the data processing apparatus is configured, when access to a selected data item in the memory is required, to determine with reference to the index items in the index data store if the selected data item is stored in the temporary data store, and, if it is determined that the selected data item is stored in the temporary data store, to determine if a duration for which the selected index item has been stored in the index data store exceeds a predetermined period, and, if the duration for which the selected index item has been stored in the index data store exceeds the predetermined period, to cause the selected data item to be retrieved from the memory.

11. The data processing apparatus as claimed in claim 1, wherein the data processing apparatus is configured, when access to a selected data item in the memory is required, to determine with reference to the index items in the index data store if the selected data item is stored in the temporary data store, and if a selected index item corresponding to the selected data item is marked as invalid, to cause the selected data item to be retrieved from the memory.

12. The data processing apparatus as claimed in claim 1, wherein a number of the plural data storage locations in the temporary data store is greater than a number of index items which are processed by the rolling invalidation process in the predetermined period.

13. The data processing apparatus as claimed in claim 1, wherein the data processing apparatus is configured, when it is determined that the newly retrieved data item must be retrieved from the memory to the temporary data store, to delay the retrieval until a previous data item stored in the storage location has been stored in the temporary data store for longer than the predetermined period.

14. The data processing apparatus as claimed in claim 1, wherein the data items are portions of a reference frame of video data.

15. The data processing apparatus as claimed in claim 14, wherein each index item is stored in the index data store at a location given by a hash of at least one identifier associated with the corresponding portion of the reference frame.

16. The data processing apparatus as claimed in claim 15, wherein the at least one identifier comprises at least one of: coordinate value information, a reference frame identifier, and information regarding a storage location in the memory.

17. A data processing apparatus comprising:
- means for storing data items retrieved from a memory, wherein the means for storing data items has plural data storage locations configured to store the data items;
- means for selecting a storage location of the plural data storage locations in which to store a newly retrieved data item according to a predetermined circular sequence of the plural data storage locations;
- means for storing index items corresponding to the data items stored in the means for storing data items, wherein presence of a valid index item in the means for storing index items is indicative of a corresponding data item in the means for storing data items; and
- means for performing a rolling invalidation process with respect to the index items stored in the means for storing index items, wherein the rolling invalidation process comprises sequentially processing the index items stored in the means for storing index items and selectively marking the index items as invalid according to a predetermined criterion,
- wherein the means for performing a rolling invalidation process is configured, when performing the rolling invalidation process, such that the predetermined criterion is fulfilled if a duration for which a selected index item has been stored in the means for storing index items exceeds a predetermined period, and
- wherein the means for performing a rolling invalidation process is configured to determine the duration for which the selected index item has been stored in the means for storing index items with reference to a count of a number of index items which have been stored in the means for storing index items since the selected index item was stored in the means for storing index items.

18. A method of data processing comprising:
- storing data items retrieved from a memory in plural data storage locations configured to store the data items;
- selecting a storage location of the plural data storage locations in which to store a newly retrieved data item according to a predetermined circular sequence of the plural data storage locations;
- storing index items corresponding to the data items stored in the plural data storage locations, wherein presence of a valid stored index item is indicative of a corresponding data item in the plural data storage locations; and
- performing a rolling invalidation process with respect to the stored index items, wherein the rolling invalidation process comprises sequentially processing the stored index items and selectively marking the index items as invalid according to a predetermined criterion and the predetermined criterion is fulfilled if a duration for which a selected index item has been stored in the index data store exceeds a predetermined period, and
- determining the duration for which the selected index item has been stored with reference to a count of a number of index items which have been stored since the selected index item was stored.

* * * * *